US009552784B2

(12) United States Patent
Suzuki et al.

(10) Patent No.: US 9,552,784 B2
(45) **Date of Patent: *Jan. 24, 2017**

(54) LIQUID CRYSTAL DISPLAY APPARATUS

(71) Applicant: Japan Display Inc., Minato-ku (JP)

(72) Inventors: Daiichi Suzuki, Tokyo (JP); Yukio Tanaka, Tokyo (JP); Kenji Nakao, Tokyo (JP); Kazuhiro Nishiyama, Tokyo (JP); Shinichi Komura, Tokyo (JP); Shinichiro Oka, Tokyo (JP); Mika Oiwa, Tokyo (JP)

(73) Assignee: Japan Display Inc., Minato-ku (JP)

( * ) Notice: Subject to any disclaimer, the term of this patent is extended or adjusted under 35 U.S.C. 154(b) by 124 days.

This patent is subject to a terminal disclaimer.

(21) Appl. No.: 14/449,444

(22) Filed: Aug. 1, 2014

(65) Prior Publication Data

US 2015/0035816 A1 Feb. 5, 2015

(30) Foreign Application Priority Data

Aug. 5, 2013 (JP) ................................ 2013-162621

(51) Int. Cl.
*G06F 3/045* (2006.01)
*G09G 3/36* (2006.01)

(52) U.S. Cl.
CPC .......... *G09G 3/3614* (2013.01); *G09G 3/3648* (2013.01); *G09G 2310/0281* (2013.01); *G09G 2310/06* (2013.01); *G09G 2320/0247* (2013.01); *G09G 2330/021* (2013.01); *G09G 2340/0435* (2013.01)

(58) Field of Classification Search
CPC ................ G09G 3/3614; G09G 3/3648; G09G 2310/0281; G09G 2310/06; G09G 2320/0247; G09G 2330/021; G09G 2340/0435
USPC .......................................... 345/173–179, 211
See application file for complete search history.

(56) References Cited

U.S. PATENT DOCUMENTS

2002/0093473 A1 7/2002 Tanaka et al.
2010/0309419 A1 12/2010 Oka et al.
2011/0025935 A1* 2/2011 Oka .................. C09K 19/0258 349/33
2011/0090183 A1* 4/2011 Yamazaki ............ G09G 3/3648 345/204
2015/0102988 A1* 4/2015 Suzuki ................ G09G 3/3648 345/92

FOREIGN PATENT DOCUMENTS

JP 2002-278523 9/2002
JP 2010-282037 12/2010

* cited by examiner

*Primary Examiner* — Nelson Rosario
(74) *Attorney, Agent, or Firm* — Oblon, McClelland, Maier & Neustadt, L.L.P.

(57) ABSTRACT

According to one embodiment, a lateral electric-field type of liquid crystal display device includes a display panel including a plurality of liquid crystal pixels arranged in a matrix, and a controller configured to perform intermittent driving to rewrite an image signal to the liquid crystal pixels, wherein a frame frequency falls within a range of 10 Hz to 20 Hz, and an absolute value of a flexo coefficient (e11, e33) of a liquid crystal applied to the liquid crystal pixels is 1.6 pC/m or less.

10 Claims, 11 Drawing Sheets

| | (Case 1) | (Case 2) | (Case 3) |
|---|---|---|---|
| Holding capacitance | Absent | Present | Present |
| Impedances of liquid crystal and alignment film | Mismatching (R1•C1 << R2•C2) | Mismatching (R1•C1 << R2•C2) | Matching (R1•C1 = R2•C2) |
| Variation of holding voltage |   |   |   |

| | Relative dielectric constant | Capacitance ratio |
|---|---|---|
| SiN (Cs) | 6.10 | 0.5000 |
| SiN (C0) | 6.10 | 1.0000 |
| Alignment film (C2) | 4.00 | 1.1803 |
| Liquid crystal (C1) | 4.00 | 0.3000 |

LIQUID CRYSTAL DISPLAY APPARATUS

CROSS-REFERENCE TO RELATED APPLICATIONS

This application is based upon and claims the benefit of priority from Japanese Patent Application No. 2013-162621, filed Aug. 5, 2013, the entire contents of which are incorporated herein by reference.

FIELD

Embodiments described herein relate generally to a liquid crystal display device.

BACKGROUND

Liquid crystal display devices are provided in various devices, for example, a television device, a vehicle-mounted display such as a car navigation device, and mobile terminals such as a notebook personal computer, a tablet PC, a cell phone, and a smart phone.

Such liquid crystal display devices adopt various mode liquid crystals which are applied in accordance with purposes.

For example, in a vertical electric field type of liquid crystal display device such as a twisted nematic (TN) mode liquid crystal display device or an optically compensated bend (OCB) mode liquid crystal display device, an alignment direction of liquid crystal molecules included in a liquid crystal layer held between an upper substrate and a lower substrate is controlled by an electric field generated between a counter-electrode provided in the upper substrate and pixel electrodes provided in the lower substrate.

Furthermore, in a lateral electric field type of liquid crystal display device such as an in-plane switching (IPS) mode liquid crystal display device or a fringe-field switching (FFS) mode liquid crystal display device, a counter-electrode (referred to as a COM electrode in this type) and pixel electrodes are provided in the same substrate, and an alignment direction of liquid crystal display molecules included in a liquid crystal layer is controlled by an electric field (fringe electric field) generated between the counter-electrode and the pixel electrodes. The FFS mode liquid crystal display device can ensure a great aperture ratio, and thus has a high luminance and a good viewing angle characteristic.

It should be noted that a liquid crystal display device for use in a mobile terminal is strongly required to reduce the power consumption of a circuit, and a low-frequency driving method, an intermittent driving method, etc. are proposed as means for reducing the power consumption of the circuit. The low-frequency driving method is a method of reducing the power of the circuit by lowering a drive frequency of the liquid crystal display device to, e.g., ½ or ¼ of that under standard conditions. The intermittent driving method is a method of reducing the power of the circuit by stopping the circuit for a time period corresponding to several display time periods after writing is performed for a single display time period. In both those driving methods, a period of rewriting a video signal in a liquid crystal display unit is long. Thus, those driving methods are not suitable for displaying of moving images. However, they can be effectively applied, as methods for lowering the power of the circuit, to displaying of a still image or the like whose visibility is held in little account.

If the low-frequency driving method or the intermittent driving method is applied to a liquid crystal display device, it is necessary to reduce a flicker.

For example, in the case where a frame frequency was 60 Hz, which is applied in an ordinary liquid crystal display device, a flicker was not visibly recognized. On the other hand, in the case where the frame frequency was 20 Hz, which is ⅓ of 60 Hz, a flicker was visibly recognized. Furthermore, in the case where the frame frequency was further lowered, a flicker was more remarkably visibly recognized.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

DETAILED DESCRIPTION

Various embodiments will be described hereinafter with reference to the accompanying drawings.

In general, according to one embodiment, a lateral electric field type of liquid crystal display device includes a display panel in which a plurality of liquid crystal pixels are arranged in a matrix, and a controller which performs intermittent driving to rewrite an image signal to be supplied to the liquid crystal pixels, wherein a frame frequency is a value which falls within the range of 10 Hz to 20 Hz, and an absolute value of a flexo coefficient (e11, e33) of a liquid crystal applied to the liquid crystal pixels is 1.6 pC/m or less.

The liquid crystal display device according to the embodiment will be explained in detail with reference to the accompanying drawings.

Figure 1:
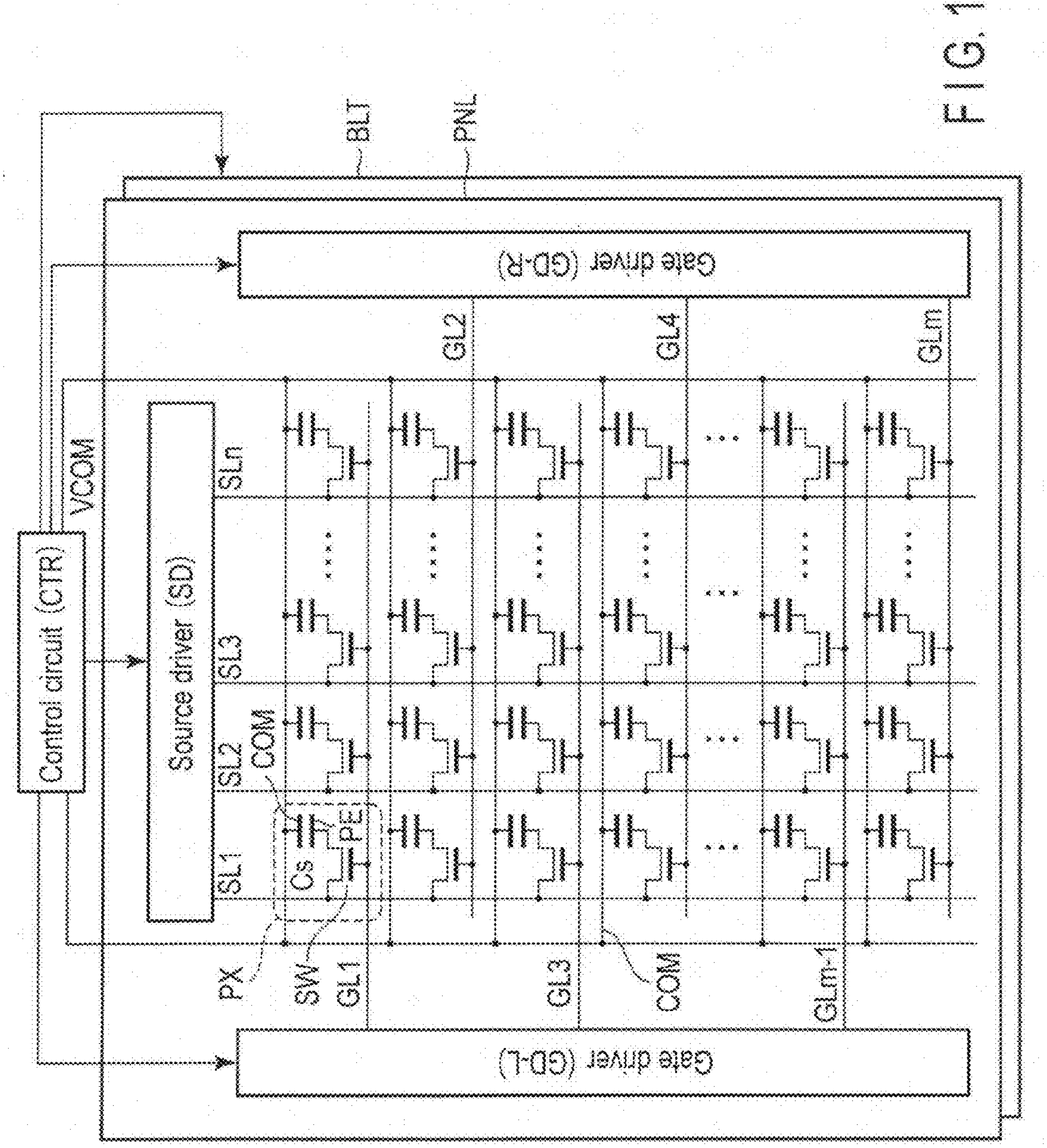
FIG. 1 is a plan view schematically showing a structure of a liquid crystal display device according to an embodiment.

FIG. 1 is a schematic plan view showing a structure of the liquid crystal display device according to the embodiment.

The liquid crystal display device comprises a liquid crystal display panel PNL and a backlight BLT which illuminates the liquid crystal display panel PNL from a rear surface side. The liquid crystal display panel PNL is provided with a display portion including display pixels PX arranged in a matrix.

Figure 2:
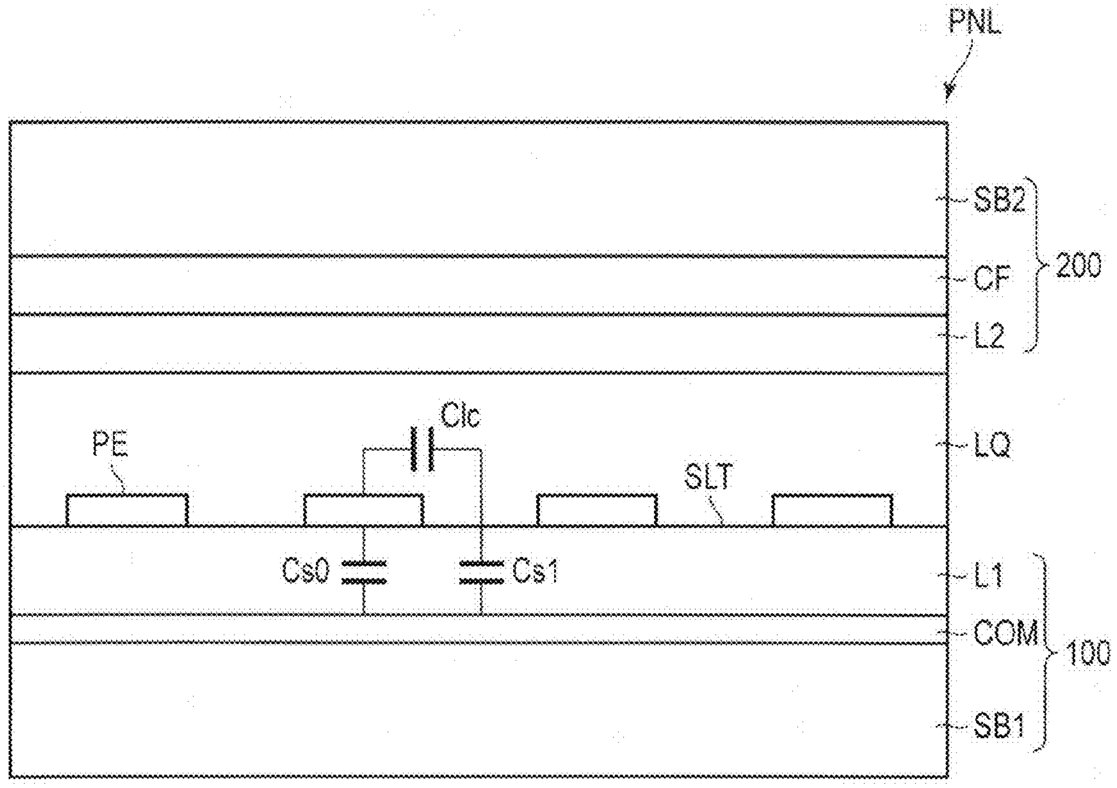
FIG. 2 is a view showing a cross section of a display pixel portion of a liquid crystal display panel of the liquid crystal display device according to the embodiment.

FIG. 2 is a view showing a cross section of a display pixel portion of the liquid crystal display panel PNL of the liquid crystal display device according to the embodiment.

The liquid crystal display panel PNL comprises an array substrate 100, a counter-substrate 200 and a liquid crystal layer LQ held between the substrates 100 and 200.

In the counter-substrate 200, a transparent insulating substrate SB2, a color filter layer CF and an overcoat layer L2 are provided. The color filter layer CF includes colored layers provided on the transparent insulating substrate SB2, which are colored red (R), green (G) and blue (B). The overcoat layer L2 is provided to cover the color filter layer CF, and prevents substances contained in the color filter layer CF from flowing into the liquid crystal layer LQ.

The array substrate 100 comprises a transparent insulating substrate SB1, a counter-electrode (first electrode) COM, and a plurality of pixel electrodes (second electrodes) PE. The pixel electrodes PE are provided on the counter-electrode COM, with an insulating layer L1 interposed between the pixel electrodes PE and the counter-electrode COM, the insulating layer L1 being formed of silicon nitride (SiN). The pixel electrodes PE are provided in display pixels PX, respectively, and include opening portions SLT each formed in the shape of a slit. The counter-electrode COM and the pixel electrodes PE are transparent electrodes formed of, e.g., indium tin oxide (ITO).

As shown in FIG. 1, at the display portion, the array substrate 100 includes scanning lines GL (GL1, GL2, . . . ) extending along columns of display pixels PX, signal lines (SL1, SL2, . . . ) extending along rows of display pixels PX, and pixel switches SW provided close to intersections of the scanning lines GL and the signal lines SL.

The pixel switches SW comprise thin film transistors (TFTs). The pixel switches SW include gate electrodes which are electrically connected to associated scanning lines GL, respectively. Also, the pixel switches SW include source electrodes which are electrically connected to associated signal lines SL, respectively. Furthermore, the pixel switches SW include drain electrodes which are electrically connected to associated pixel electrodes PE, respectively.

The array substrate 100 comprises a source driver SD and gate drivers GD (a left gate driver GD-L and a right gate driver GD-R) as drive means for driving the display pixels PX. The scanning lines GL are electrically connected to output terminals of the gate drivers GD. The signal lines SL are electrically connected to output terminals of the source driver SD.

The gate drivers GD and the source driver SD are provided in peripheral areas of the display portions. The gate drivers GD successively apply on-voltages to scanning lines GL, as a result of which the on-voltages are applied to the gate electrodes of the pixel switches SW, which are electrically connected to selected scanning lines GL, i.e., the above scanning lines GL. To be more specific, when an on-voltage is applied to a gate electrode, electrical conduction is effected between the source electrode and drain electrode of a pixel switch SW including the above gate electrode. On the other hand, the source driver SD supplies output signals to the signal lines SL, respectively. To be more specific, when an output signal is supplied to a signal line SL, it is also supplied, through the pixel switch SW in which electrical conduction is effected between its source and drain electrodes, to an associated pixel electrode PE.

Operations of the gate drivers GD and the source driver SD are controlled by a control circuit CTR provided outside the liquid crystal display panel PNL. Furthermore, the control circuit CTR applies a counter-voltage Vcom to the counter-electrode COM, and also controls an operation of the backlight BLT.

The control circuit CTR has a function of performing intermittent driving to reduce electric power, in addition to a function of performing ordinary driving. It should be noted that a time period in which a single frame is rewritten is referred to as a "frame period" and its reciprocal is as a "frame frequency". This will also be applied to the intermittent driving and low-frequency driving of the present application.

Suppose by way of example a standard frame frequency of the liquid crystal display device is 60 Hz (a single frame is rewritten every 1/60 sec). In the case of displaying moving images, the liquid crystal display device is operated at 60 Hz, which is the standard frame frequency, and in the case of displaying a still image or the like whose visibility is held in little account, the control circuit CTR performs intermittent driving.

The control circuit CTR sets a non-operation period of, e.g., 1/60 sec, 3/60 sec, 7/60 sec or 59/60 sec after performing a writing operation (scanning from an upper side of a screen to a lower side thereof) for 1/60 sec. In the non-operation period, by stopping the writing operation of the control circuit CTR, the power consumption of the circuit is made substantially zero. As a result, the time-averaged power consumption of the circuit in all time periods including the time of performing the writing operation is reduced to ½, ¼, ⅛ or 1/60 of that in the case where the non-operation period is not provided.

It should be noted that in the above driving method, it is necessary that after a pixel voltage is applied to each of pixels PX, it is held for a long time period. It is therefore preferable that a TFT whose off-leak current is small be applied. For example, in general, a TFT adopting an oxide of indium (In), gallium (Ga) and zinc (Zn) (IGZO) has a small off-leak current, and it is therefore said that such a TFT is a TFT suitable for the above low-frequency driving.

The liquid crystal display device according to the embodiment is a fringe-field switching (FFS) mode liquid crystal display device in which a liquid crystal layer LQ is caused to generate an electric field due to a potential difference between voltages applied to the counter-electrode COM and the pixel electrodes PE, to control an alignment direction of liquid crystal molecules in the liquid crystal layer. The transmission amount of light emitted from the backlight BLT is controlled in accordance with the alignment direction of the liquid crystal molecules.

As shown in FIG. 2, a capacitance component CsO generate between each of the pixel electrodes PE and the counter-electrode COM, which are located opposite to each other, with the insulating layer L1 interposed between them. In addition, a liquid crystal capacitance Clc and an auxiliary capacitance component Cs1 corresponding to an electric field generated in the liquid crystal layer LQ are present. Where a total capacitance, which corresponds to all the capacitances between the pixel electrodes PE and the counter-electrode COM, is denoted by Cs, the capacitance Cs is considered to be provided between the drain of the TFT and the counter-electrode COM.

Next, a driving method for reducing a flicker will be explained.

If a DC voltage is applied to liquid crystal material for long time, a display characteristic thereof varies due to charging-up with the passage of time. Thus, in general, frame driving is applied. In the frame driving, driving is performed such that the polarity is inverted in units of one frame to make a DC average substantially zero. However, if positive and negative response characteristics (luminance-voltage characteristics) are different from each other, the luminances of positive and negative frames are also different from each other, and the luminance fluctuates each time the frame changes, thus causing a flicker. Although the flicker can be minimized by applying a minute offset voltage for an average (DC average value) of signals inverted in polarity or adjusting a potential of the counter-electrode, it is impossible to suppress the flicker by completely absorbing a change of the brightness-voltage characteristic which occurs as time passes, a variance in optimal condition between gradation levels, etc.

As measures for reducing such a flicker, e.g., a line-inversion drive scheme, a column-inversion drive scheme and a dot-inversion drive scheme are known. For example, in the line-inversion drive scheme, a temporal phase of polarity inversion is set such that the polarity is inverted between positive and negative polarities in units of one row, thereby causing the difference between positive and negative luminance responses to be macroscopically zero, and preventing the flicker from being visibly recognized. Similarly, in the column-inversion drive scheme, the phase of polarity inversion is reversed in units of one column, and in the dot-inversion drive scheme, the pixel electrodes PE arranged in a matrix are inverted in polarity in a checkerwise manner; that is, dot inversion is carried out. Thus, the column-inversion drive scheme and the dot-inversion drive scheme can also prevent a flicker from being visibly recognized.

Of those inversion drive schemes, the line-inversion drive scheme and the dot-inversion drive scheme are carried out such that at the time of performing scanning over the screen, writing to pixels is carried out while inverting the polarity in units of one row, as a result of which it is therefore necessary to perform charging and discharging of signal lines in a panel at intervals of 1 horizontal period (1H period), and the power consumption is increased. On the other hand, in the column-inversion drive scheme, the polarity is not inverted in a column direction where rows of pixels are arranged, and the power consumption of the circuit is reduced. In this regard, the column-inversion drive scheme has an advantage. In a liquid crystal display device for use in a mobile device, although any of various inversion drive scheme is adopted in accordance with specifications of a product, it is most preferable that the column-inversion drive scheme be applied in order to reduce the power consumption.

Next, a luminance response waveform of the liquid crystal display device will be explained.

Figure 3A:
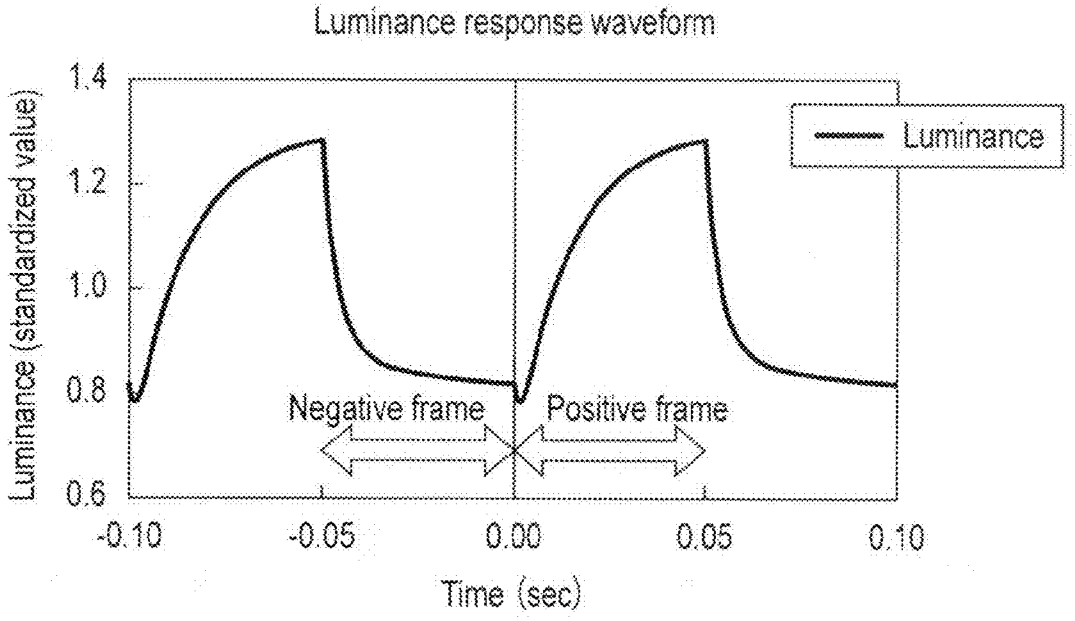
FIG. 3A is a view showing an example of a luminance response waveform with respect to the liquid crystal display device according to the embodiment.
Figure 3B:
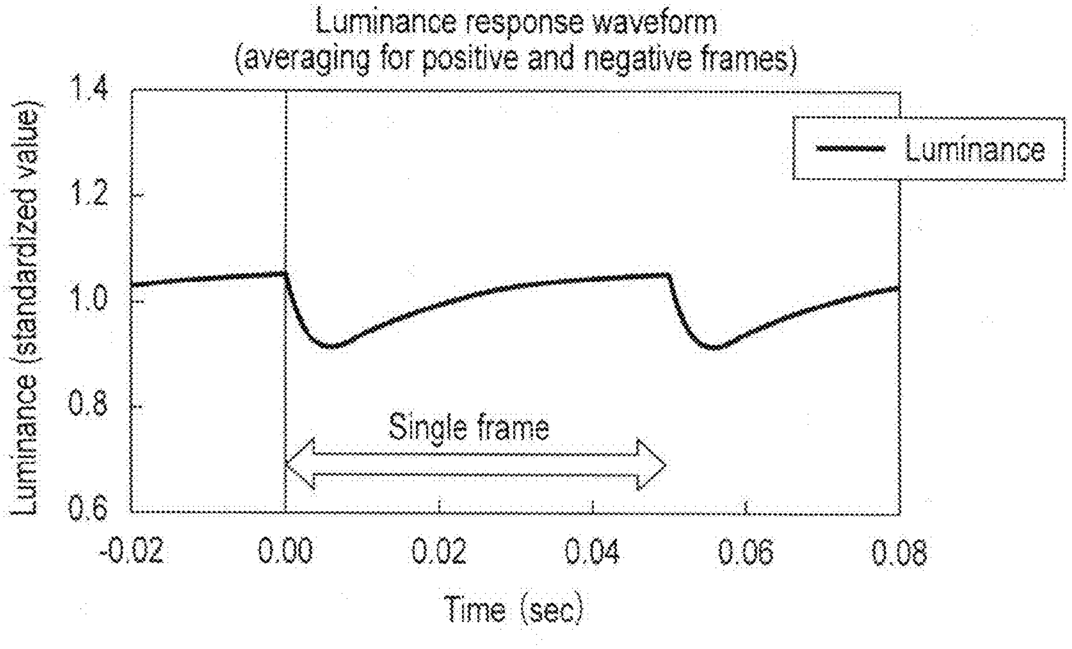
FIG. 3B is a view showing another example of the luminance response waveform with respect to the liquid crystal display device according to the embodiment.

FIGS. 3A and 3B are views showing an example of the liquid crystal display device according to the embodiment.

FIG. 3A shows a luminance response of 1 pixel in the case where driving is performed in a frame period of 50 msec (at a frame frequency of 20 Hz). In the figure, a vertical axis indicates luminance, and a horizontal axis indicates time. It should be noted that the luminance is standardized such that an average value is 1. The polarity of a video signal to be written to pixels is inverted in units of one frame, and intervals indicated by arrows in the figure correspond to a negative frame and a positive frame, respectively.

In the luminance response as shown in FIG. 3A, in the positive frame, the luminance is increased to approximately 1.3, and in the negative frame, the luminance is decreased to approximately 0.8. Thus, the luminance in the positive frame is greatly different from that in the negative frame.

Furthermore, as another feature, it is seen that the luminance momentarily lowers for several milliseconds immediately after the frame is switched from the negative frame to the positive frame. This is a phenomenon specific to the FFS mode, and seems to be because liquid crystal molecules have spontaneous polarization due to a flexo-electric effect of liquid crystal, and the alignment direction of liquid crystal molecules is changed without delay in response to inversion of an electric field.

FIG. 3B shows an averaged waveform of luminance responses of the positive and negative frames as shown in FIG. 3A (which is obtained by dividing a combination of two waveforms into two). The waveform as shown in FIG. 3B corresponds to a luminance response waveform observed macroscopically (in the case of paying attention to a sufficiently wide area where the number of pixels having positive polarity is substantially the same as that of pixels having negative polarity) when the liquid crystal display device is driven in the line-inversion drive scheme, the column-inversion drive scheme or the dot-inversion drive scheme. Due to the above averaging for the positive and negative frames, the influence of the difference in luminance between the positive and negative frames is canceled. However, a phenomenon occurs in which the luminance momentarily lowers immediately (at a lead of the frame) after inversion of the polarity, as a result of which variation of the luminance still occurs in a period of 50 msec. The lowering of the luminance at the lead of the frame is caused by the above flexo-electric effect, and seems maintained without being canceled even by the above averaging for the positive and negative frames.

It is known that in general, the visibility with which a person can view a flicker depends on a frequency, and with respect to frequencies, even if the luminance fluctuates in the same fluctuation range, a flicker is more easily visibly as the frequency lowers.

Figure 4:
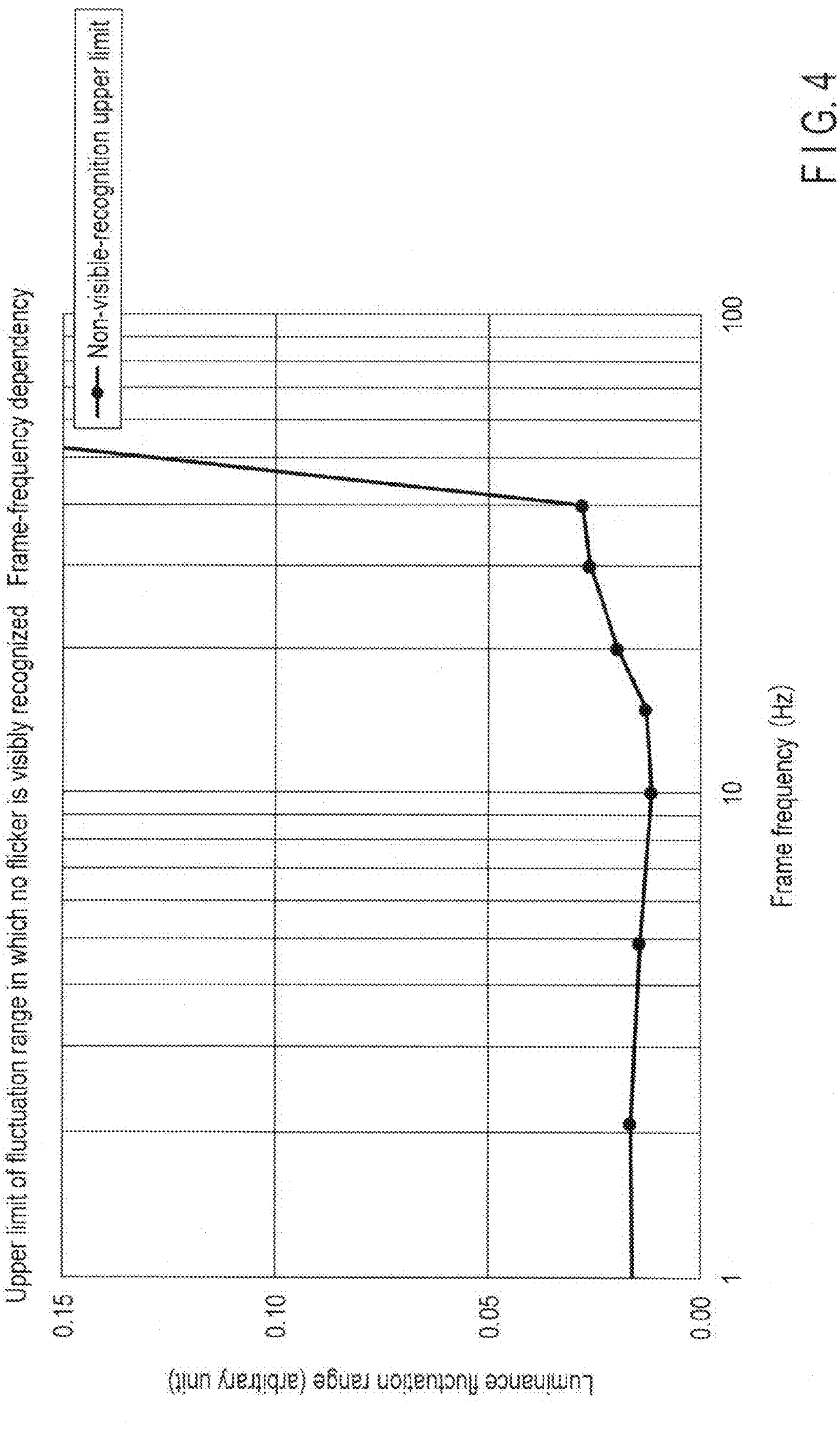
FIG. 4 is a view obtained by subjectively evaluating a relationship between a frame frequency and an upper limit of a fluctuation range of a luminance in which a flicker is not visibly recognized.

FIG. 4 is a view obtained by subjectively evaluating a relationship between a frame frequency and an upper limit of a fluctuation range of the luminance in which a flicker cannot be visibly recognized. According to a graph shown in the view, the upper limit steeply rises when the frame frequency exceeds 40 Hz. This means that in the case where the frame frequency is greater than 40 Hz, even if the fluctuation range of the luminance is great, a flicker is not visibly recognized; however, in the case where the frame frequency is equal to or smaller than 40 Hz, even if the fluctuation range of the luminance is small, a flicker is visibly recognized.

From the above result of the subjective evaluation, it can be considered that if the luminance fluctuates to such a degree as shown in FIG. 3B, a flicker is not visibly recognized when the frame frequency is 60 Hz, which is an ordinary frame frequency; however, a flicker is visibly recognized when the frame frequency is lowered to 40 Hz or less.

The inventors studied how to prevent visible recognition of a flicker which is visibly recognized even in the case where as described above, the liquid crystal display device is driven in the line-inversion drive scheme, the column-inversion drive scheme, the dot-inversion drive scheme or the like, and clarified that there is a case where a flicker is caused by a flexo-electric effect and also a case where a flicker is caused by an impedance mismatch between a liquid crystal and an alignment film.

First, a flicker caused by a flexo-electric effect will be explained.

The flexo-electric effect is a phenomenon in which liquid crystal molecules are polarized when an electric field is applied. In particular, in a lateral electric-field mode, a more intense electric field acts on an edge portion of an electrode than in a vertical electric-field mode. It can be considered that when liquid crystal molecules are reversely polarized by the above intense electric field, and the polarity of the electric field varies, the polarization instantaneously reacts, and as a result such a luminance variation as shown in FIG. 3B occurs. It is therefore possible to prevent a flicker from being visibly recognized, by applying a liquid crystal in which a flexo-electric effect is not easily generated, to reduce the luminance fluctuation.

Figure 5:
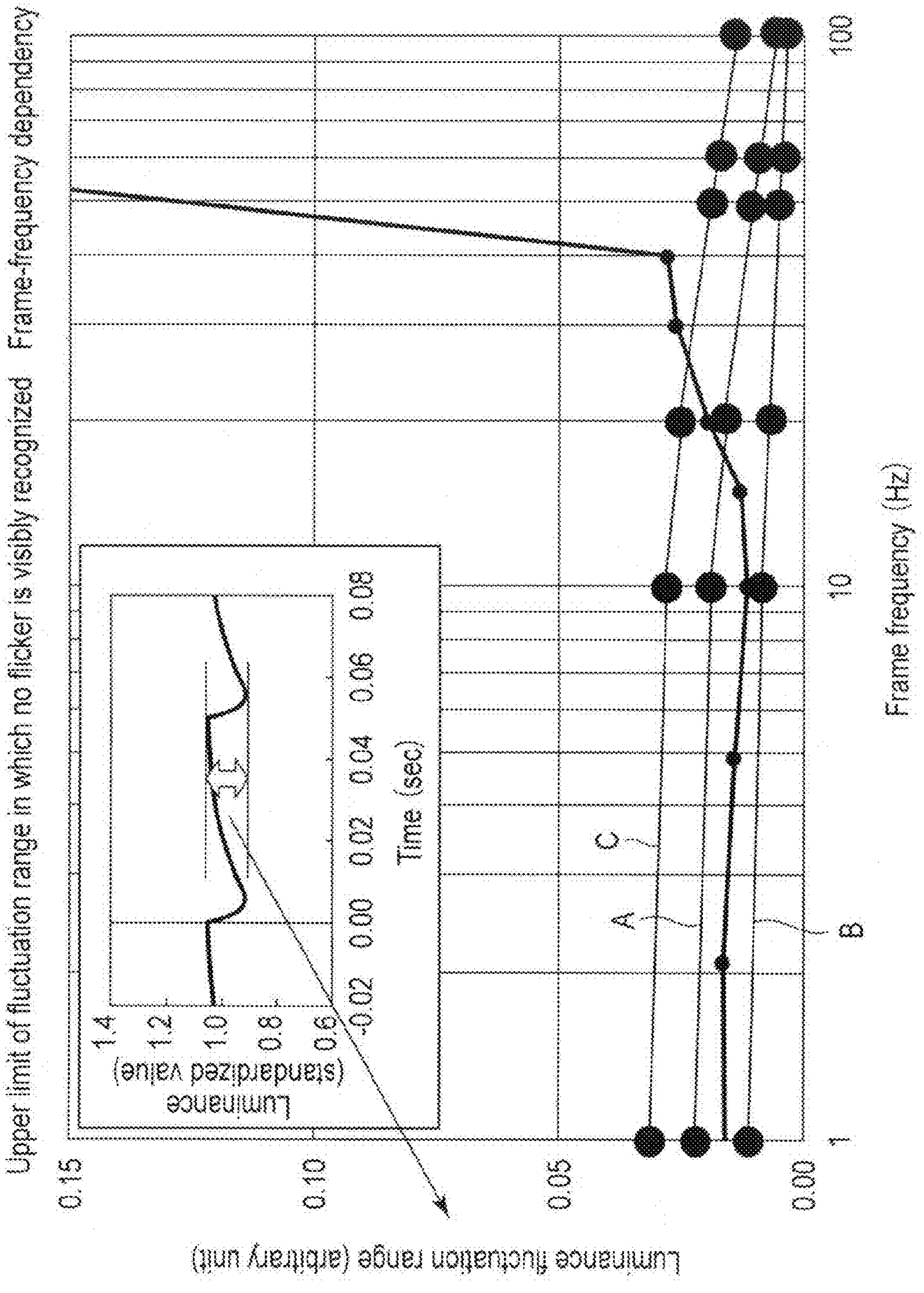
FIG. 5 is a view showing fluctuation ranges of luminances respect to materials having different flexo coefficients, in combination with the view of FIG. 4 showing characteristics.

FIG. 5 is a view showing fluctuation ranges of luminances with respect to materials having different flexo coefficients, in combination with the view of FIG. 4 showing the characteristics. A curve C indicates a relationship between the frame frequency and the fluctuation range of the luminance in the case of applying a conventional liquid crystal. A curve A indicates a relationship between the frame frequency and the fluctuation range of the luminance in the case of applying a low flexo liquid crystal A. An absolute value of a flexo coefficient (e11, e33) of the low flexo liquid crystal A is 1.6 pC/m. A curve B indicates a relationship between the frame frequency and the fluctuation range of the luminance in the case of applying a low flexo liquid crystal B. An absolute value of a flexo coefficient (e11, e33) of the low flexo liquid crystal B is 0.8 pC/m.

With respect to the curves A-C, a flicker is visibly recognized in a range located upward of a range indicated by a characteristic curve, in which a flicker is not visibly recognized. Thus, as to the curve C (conventional liquid crystal), with a frame frequency of 20 to 30 Hz or less, a flicker was visibly recognized. As to the curve A (low flexo liquid crystal A), with a frame frequency of 10 to 20 Hz or less, a flicker was visibly recognized. As to the curve B (low flexo liquid crystal B), with a frame frequency of 1 Hz or more, a flicker was not visibly recognized.

It can be seen from FIG. 5 that a frame frequency with which a flicker is visibly recognized lowers as the absolute value of the flexo coefficient (e11, e33) lowers. Therefore, it is possible to prevent a flicker from being visibly recognized by selecting a liquid crystal to be applied, in accordance with a frame frequency band to be applied, based on FIG. 5.

For example, in the case where the frame frequency falls within the range of 10 to 20 Hz, a liquid crystal whose absolute value of a flexo coefficient (e11, e33) is 1.6 pC/m or less is applied. In the case where the frame frequency is 10 Hz or less, a liquid crystal whose absolute value of a flexo coefficient (e11, e33) is 0.8 pC/m or less is applied.

A symmetric component and an antisymmetric component for use in studying a cause of a luminance fluctuation due to a cell at the time of performing low-frequency driving will be explained.

Figure 6A:
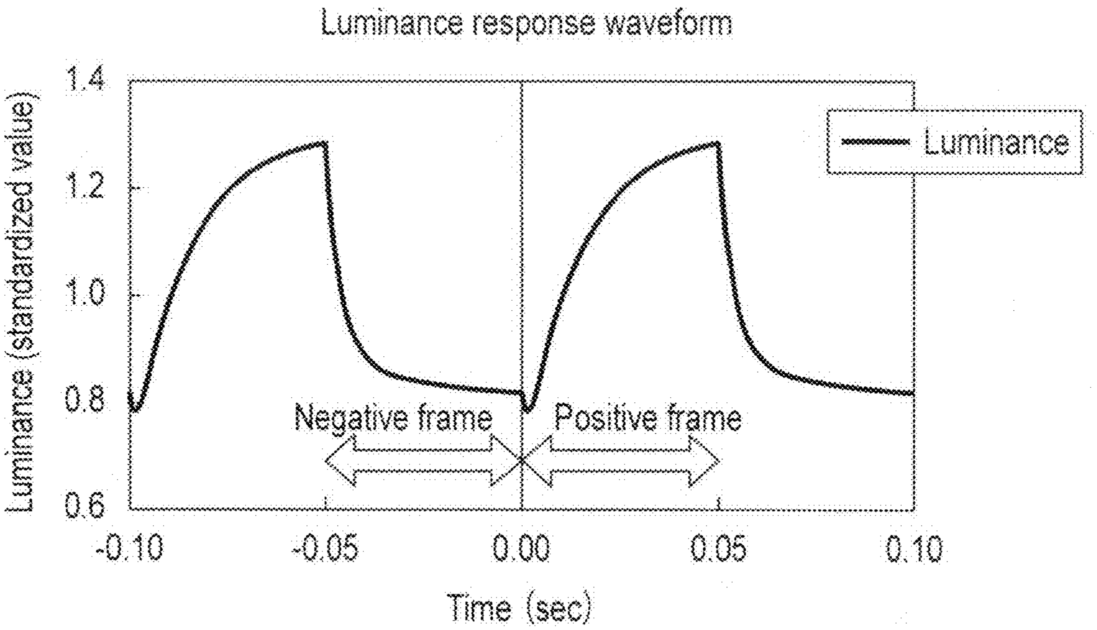
FIG. 6A is a view for use in explaining symmetric and antisymmetric components with respect to the liquid crystal display device according to the embodiment.
Figure 6B:
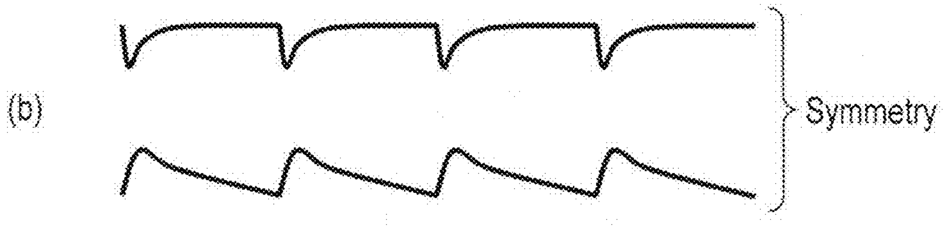
FIG. 6B is a view for use in explaining the symmetric component with respect to the liquid crystal display device according to the embodiment.
Figure 6C:
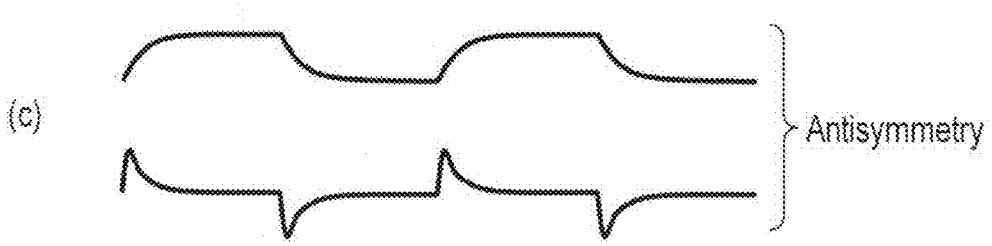
FIG. 6C is a view for use in explaining the antisymmetric component with respect to the liquid crystal display device according to the embodiment.

FIGS. 6A-6C are views for use in explaining a symmetric component and an antisymmetric component in the liquid crystal display device according to the embodiment. A luminance response waveform as shown in FIG. 6A is a waveform which indicates the luminance of a positive frame and that of a negative frame, and shows that the luminance is switched between the luminances of the positive and negative frames each time the frame changes.

It should be noted that the symmetric component corresponds to an average waveform of the luminance waveform of the positive frame and that of the negative frame, i.e., such a waveform as shown in FIG. 3B. In the symmetric component, each time the frame changes, the same waveform (symmetric waveform) is obtained. That is why it is referred to as a symmetric component. FIG. 6B shows an example of the symmetric component. If the symmetric waveform has a flat characteristic, it means that it is averaged to have a flat characteristic. Thus, when driving is performed in the line-inversion drive scheme, the column-inversion drive scheme or the dot-inversion drive scheme in the above manner, it can be visibly recognized that the fluctuation range of the luminance is small (a flicker does not occur). Therefore, the symmetric component is a component which is not eliminated by the inversion drive scheme.

On the other hand, the antisymmetric component corresponds to a waveform which is expressed, after determining an average waveform of the luminance waveform of the positive waveform and that of the negative waveform, with the average waveform determined as zero (a reference). Therefore, a positive waveform and a negative waveform appear. That is why the above component is referred to as an antisymmetric component. FIG. 6C shows an example of the antisymmetric component. If the antisymmetric component has a symmetric characteristic with respect to a reference line, it is visibly recognized as a component in which the luminance does not fluctuate (no flicker occurs), when driving is performed in the line-inversion drive scheme, the column-inversion drive scheme or the dot-inversion drive scheme. Therefore, the antisymmetric component is a component which can be eliminated by the inversion drive scheme.

Figure 7A:
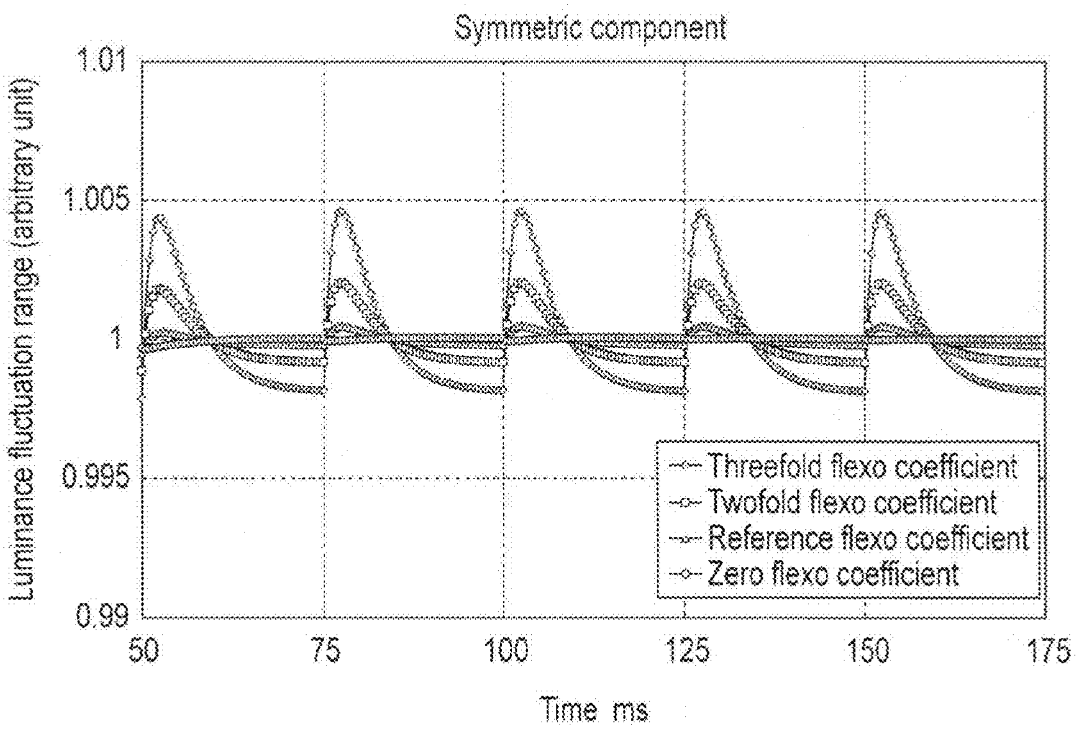
FIG. 7A is a view showing how symmetric components vary with respect to materials having different flexo coefficients in the liquid crystal display device according to the embodiment.
Figure 7B:
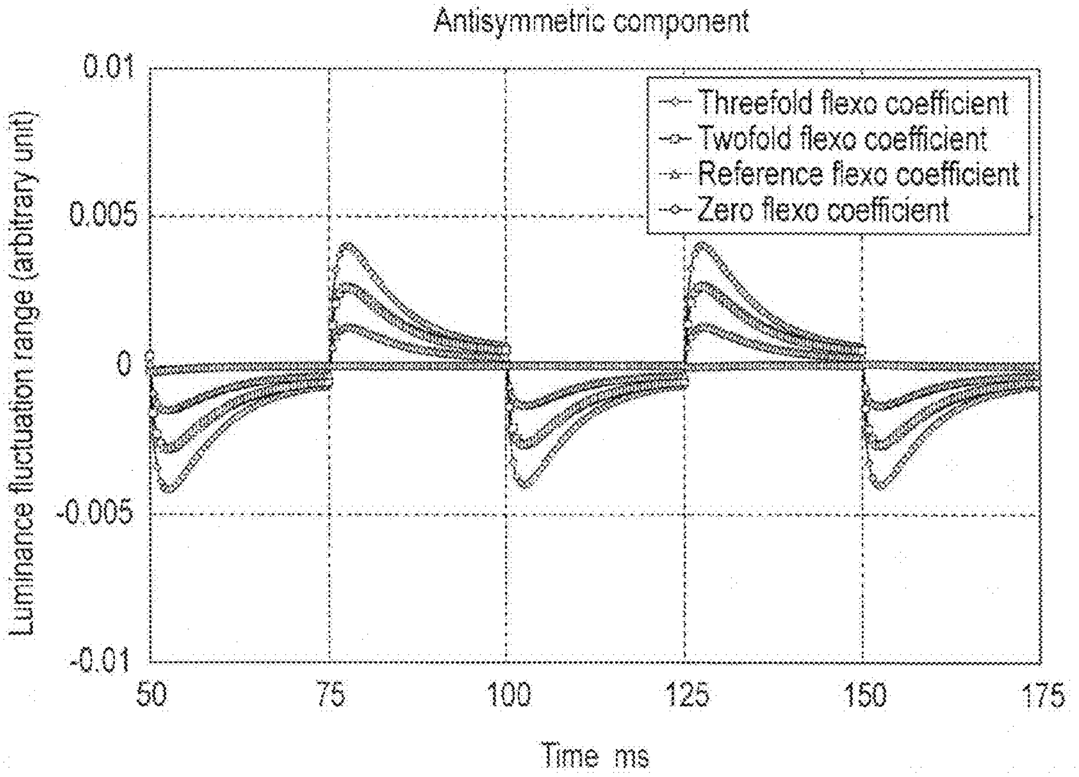
FIG. 7B is a view showing how antisymmetric components vary with respect to the materials having different flexo coefficients in the liquid crystal display device according to the embodiment.

FIGS. 7A and 7B are views showing how symmetric and antisymmetric components vary with respect to materials having flexo coefficients in the liquid crystal display device according to the embodiment. FIG. 7A show changes of symmetric components which vary in accordance with flexo coefficients, and FIG. 7B shows changes of antisymmetric components which vary in accordance with flexo coefficients.

From FIGS. 7A and 7B, it can be seen that when the flexo coefficient is decreased, the fluctuation ranges of the luminances of both the symmetric component and the antisymmetric component can be decreased. On the other hand, the antisymmetric component is macroscopically canceled by carrying out the line-inversion drive scheme, the column-inversion drive scheme or the dot-inversion drive scheme, as a result of which a flicker can be reduced; however, the symmetric component cannot be canceled. Therefore, it can be seen that in order to reduce the symmetric component, it is effective that the flexo coefficient is decreased.

Next, a flicker caused by an impedance mismatch between a liquid crystal and an alignment film will be explained.

As described above, in the intermittent driving method, it is necessary that after a pixel voltage is applied to each of pixels PX, it is held for a long time period. In order to do so, it is preferable that a TFT whose off-leak current is small be applied, and it is further necessary that the impedances of a liquid crystal and the alignment film are matched.

Figure 8A:
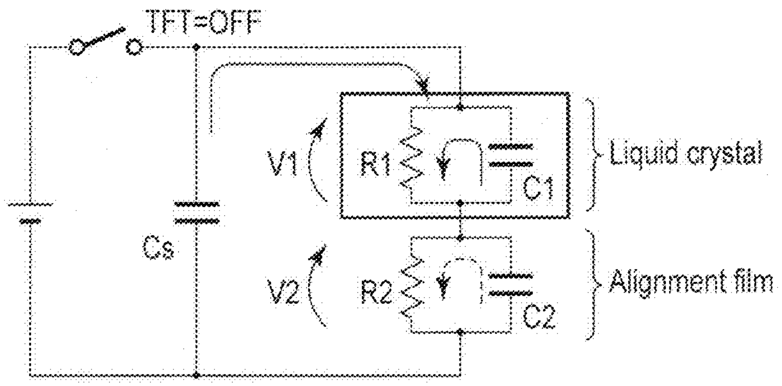
FIG. 8A is a view for use in explaining a variation of a liquid crystal holding voltage, which is caused by an impedance mismatch between liquid crystal and an alignment film in the liquid crystal display device according to the embodiment.
Figure 8B:
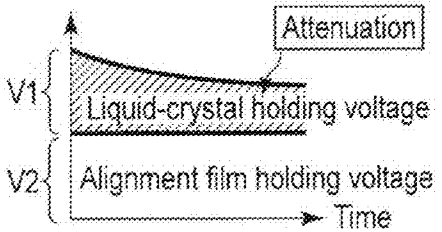
FIG. 8B is a view for use in explaining variations of the liquid crystal holding voltage, which are caused by impedance mismatches between liquid crystal and alignment films with respect to the liquid crystal display device according to the embodiment.
Figure 8B:
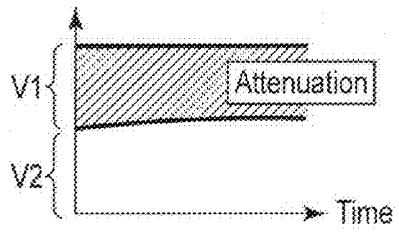
Figure 8B:
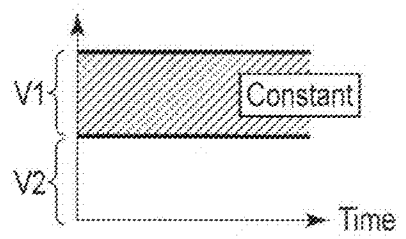

FIGS. 8A and 8B are views for use in explaining a variation of a liquid-crystal holding voltage which occurs due to an impedance mismatch between a liquid crystal and an alignment film with respect to the liquid crystal display device according to the embodiment.

A model of an equivalent circuit of a liquid crystal panel, which is shown in FIG. 8A, includes a holding capacitance Cs which is present in an region with respect to which a pixel electrode PE and a counter-electrode COM are located opposite to each other, a capacitance C2 of an alignment film which corresponds to an electric field generated in the liquid crystal layer LQ, and a liquid crystal capacitance C1. Furthermore, resistances R1 and R2 are provided in parallel with the liquid crystal capacitance C1 and the capacitance C2, respectively. It should be noted that the holding capacitance Cs, the capacitance C2 and the liquid crystal capacitance C1 correspond to the capacitance component Cs0, Cs1 and Clc as shown in FIG. 2.

Next, a variation of a liquid crystal holding voltage which occurs due to the impedance mismatch between the liquid crystal and the alignment film will be explained with reference to FIG. 8B.

In an example indicated as a case 1, a holding capacitance Cs is not present, and impedances of a liquid crystal and an alignment film do not match to each other ($R1 \cdot C1 \ll R2 \cdot C2$). In this case, when a TFT is turned off to be in a pixel voltage holding state, the liquid crystal and the alignment film are discharged independently. A time constant $R1 \cdot C1$ of a liquid crystal side is smaller than a time constant $R2 \cdot C2$ of an alignment film side, and thus attenuation of a liquid crystal holding voltage V1 becomes predominant. Therefore, in the case 1, the liquid crystal holding voltage attenuates, and the luminance fluctuates.

In an example indicated as a case 2, a holding capacitance Cs is provided, and impedances of a liquid crystal and an alignment film do not match to each other ($R1 \cdot C1 \ll R2 \cdot C2$). In this case, when a TFT is turned off to be in a pixel voltage holding state, liquid crystal and an alignment film are discharged independently, but charge is supplied from the holding capacitance Cs in such a manner as to compensate for attenuation of the voltages V1 and V2 which is caused by the above discharge. However, although the amount of charge decreased due to the discharge on the liquid crystal voltage holding voltage V1 side is larger than that on the voltage V2 side, the amount of charge supplied on the V1 side is equivalent to that on the V2 side. Therefore, with the passage of time, the voltage V1 is decreased, and the voltage V2 is increased. Therefore, in the case 2, the liquid crystal holding voltage attenuates, and the luminance fluctuates.

In an example indicated as a case 3, a holding capacitance Cs is provided, and impedances of a liquid crystal and an alignment film match to each other ($R1 \cdot C1 \approx R2 \cdot C2$). In this case, when a TFT is turned off to be in a pixel voltage holding state, the liquid crystal and the alignment film are discharged independently. However, discharging time of the liquid crystal side and that of the alignment film side are the same as each other, since the impedances match to each other. Thus, decreasing of charge due to the discharge and supplying of charge from the holding capacitance Cs are balanced, thus keeping the voltages V1 and V2 constant. Therefore, in the case 3, the fluctuation of the luminance is reduced, and the flicker is reduced.

The variation of the liquid crystal holding voltage is confirmed by making a simulation calculation with respect to the above circuit model.

Figures 9A, 9B:
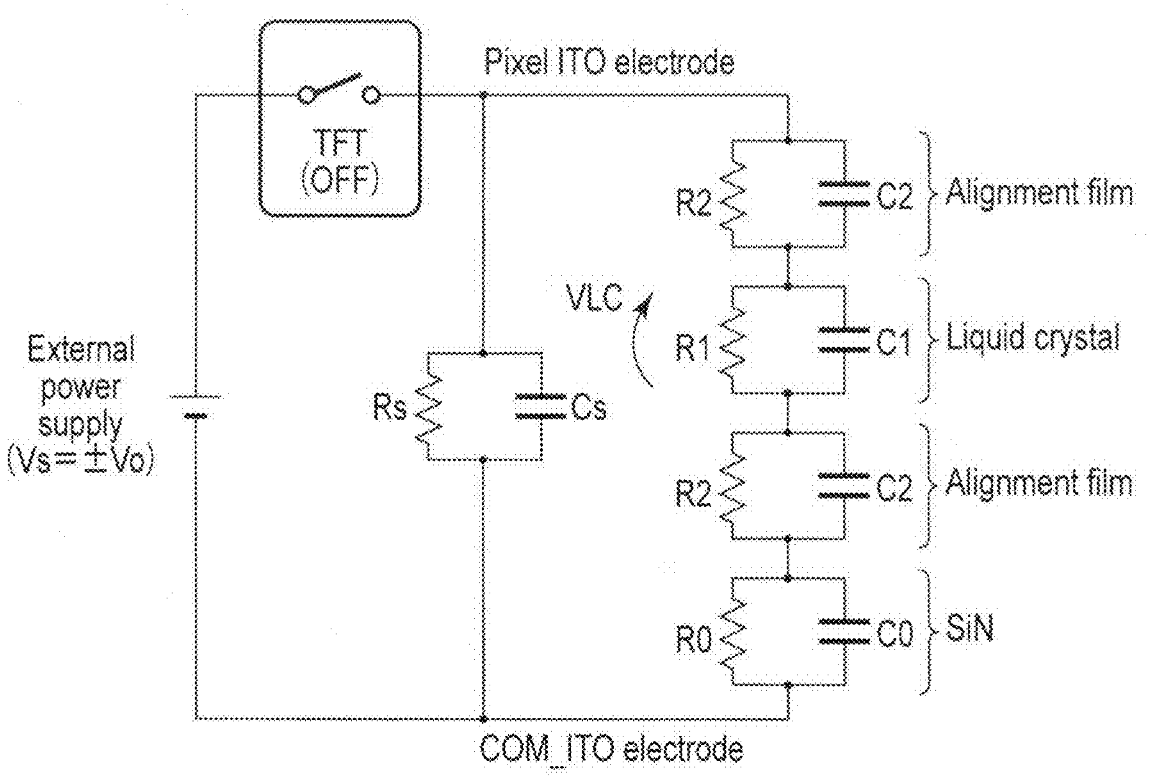
FIG. 9A is a view showing a circuit model applied to a simulation with respect to the liquid crystal display device according to the embodiment.
FIG. 9B is a view showing calculation conditions applied to the simulation with respect to the liquid crystal display device according to the embodiment.

FIGS. 9A and 9B are views showing a circuit model applied to a simulation performed with respect to the liquid crystal display device according to the embodiment and calculation conditions. FIG. 9A shows the circuit model, and FIG. 9B shows calculation conditions. It should be noted that with respect to the calculation conditions, a frame period of 0.5 seconds (frame frequency of 2 Hz) is applied to intermittent driving.

Figure 10A:
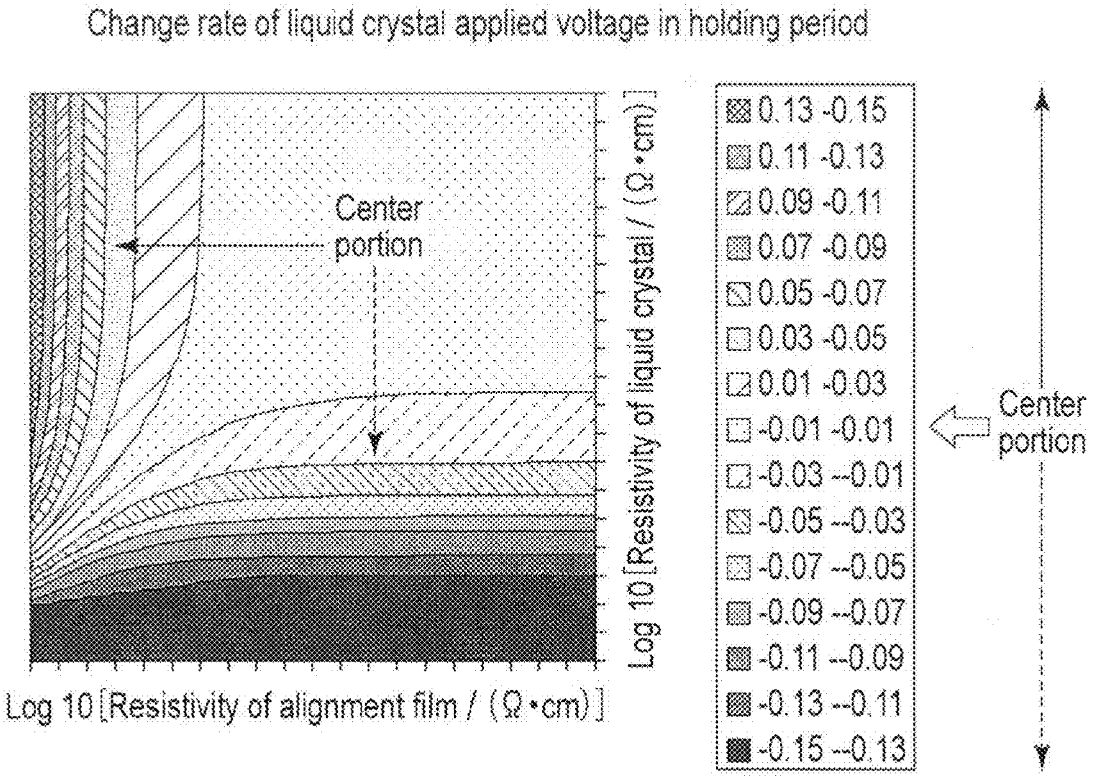
FIG. 10A is a view showing a result of the simulation with respect to a change rate of a liquid crystal applying voltage in a holding period in the liquid crystal display device according to the embodiment.
Figure 10B:
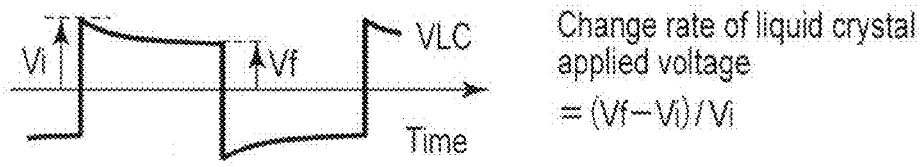
FIG. 10B is another view showing the result of the simulation with respect to the change rate of the liquid crystal display device according to the embodiment.

FIGS. 10A and 10B are views showing a result of a simulation performed with respect to a change rate of a liquid crystal applied voltage in a holding period in the liquid crystal display device according to the embodiment. FIG. 10A shows a change rate of the liquid crystal applied voltage in association with a resistivity of the alignment film and that of the liquid crystal. It should be noted that the change rate of the liquid crystal applied voltage is an index indicating a rate of a decreased or increased liquid crystal applied voltage in the holding period, and is a value as $(Vf-Vi)/Vi$ as shown in FIG. 10B.

A center portion in FIG. 10A is a region in which the change rate of the liquid crystal applied voltage is the smallest. The change rate of the liquid crystal applied voltage increases as the resistivity of the alignment film decreases, as indicated by an arrow of a solid line in the figure. On the other hand, the change rate of the liquid crystal applied voltage decreases as the resistivity of the liquid crystal decreases, as indicated by an arrow of a dotted line in the figure. Also, from this result of the simulation, it can be seen that a luminance fluctuation in a single frame can be reduced by matching the impedances of the liquid crystal and the alignment film to each other.

Figure 11:
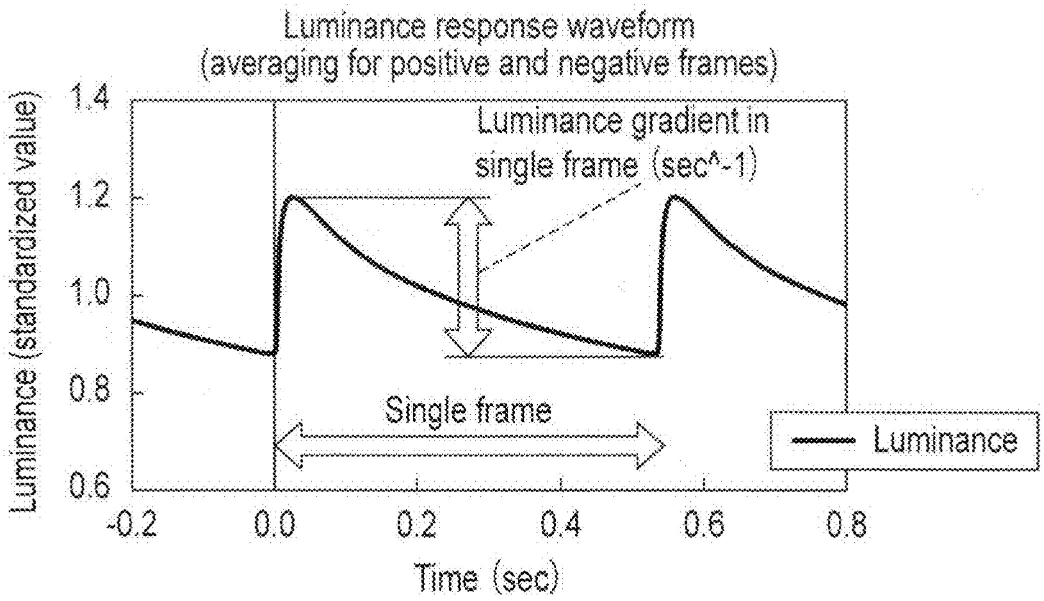
FIG. 11 is a view showing a luminance gradient in a single frame in the liquid crystal display device according to the embodiment.

As an index for quantifying the luminance fluctuation, a luminance gradient (1/sec) in a single frame is introduced. FIG. 11 is a view showing a luminance gradient in a single frame with respect to the liquid crystal display device according to the embodiment. The luminance gradient in the single frame can be defined as a decrease value or an increase value of luminance (standardized value) in the single frame.

It is determined by subjective evaluation that an upper limit of an absolute value of a luminance gradient in a single frame, in which no flicker is visibly recognized, is determined as 0.03. Thus, based on this determination and the simulation result shown in FIG. 10A, when the resistivity of the alignment film is set to $1\times10^{13}$ to $5\times10^{14}$ Ω·c, and that of the liquid crystal is set to $1\times10^{13}$ to $5\times10^{14}$ Ω·cm, the absolute value of the luminance gradient in the single frame can be determined as 0.03 or less.

As explained above, a flicker is caused by an impedance mismatch between the liquid crystal and the alignment film, as a cause of a flicker, which is other than the flexo-electric effect. Therefore, it is possible to effectively suppress the flicker by applying a liquid crystal having a flexo coefficient which can prevent a flicker from being visibly recognized with respect to a frame frequency as explained with reference to FIG. 5 to substantially equalize the impedances of the liquid crystal and alignment film.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A lateral electric-field type of liquid crystal display device comprising:

a display panel including a plurality of liquid crystal pixels arranged in a matrix; and a controller configured to perform intermittent driving to rewrite an image signal to the liquid crystal pixels, wherein a frame frequency falls within a range of 10 Hz to 20 Hz, an absolute value of a flexo coefficient (e11, e33) of a liquid crystal applied to the liquid crystal pixels is 1.6 pC/m or less, and the relationship "R1×C1≈R2×C2" is satisfied, where R1 is a resistance of the liquid crystal applied to the liquid crystal pixels, C1 is a capacitance of the liquid crystal, R2 is a resistance of an alignment film applied to the liquid crystal pixels, and C2 is a capacitance of the alignment film.

2. The liquid crystal display device of claim 1, wherein a resistivity of the liquid crystal falls within a range of $1\times10^{13}$ to $5\times10^{14}$ Ω·cm, and a resistivity of the alignment film applied to the liquid crystal pixels falls within a range of $1\times10^{13}$ to $5\times10^{14}$ Ω·cm.

3. The liquid crystal display device of claim 1, wherein the controller further performs inversion driving to rewrite the image signal to the liquid crystal pixels.

4. A lateral electric-field type of liquid crystal display device comprising:

a display panel including a plurality of liquid crystal pixels arranged in a matrix; and a controller configured to perform intermittent driving to rewrite an image signal to the liquid crystal pixels, wherein a frame frequency falls with a range of 10 Hz to 1 Hz, an absolute value of a flexo coefficient (e11, e33) of a liquid crystal applied to the liquid crystal pixels is 0.8 pC/m or less, and the relationship "R1×C1≈R2×C2" is satisfied, where R1 is a resistance of the liquid crystal applied to the liquid crystal pixels, C1 is a capacitance of the liquid crystal, R2 is a resistance of an alignment film applied to the liquid crystal pixels, and C2 is a capacitance of the alignment film.

5. The liquid crystal display device of claim 4, wherein a resistivity of the liquid crystal applied to the liquid crystal pixels falls within a range of $1\times10^{13}$ to $5\times10^{14}$ Ω·cm, and a resistivity of the alignment film applied to the liquid crystal pixels falls within a range of $1\times10^{13}$ to $5\times10^{14}$ Ω·cm.

6. The liquid crystal display device of claim 4, wherein the controller further performs inversion driving to rewrite the image signal to the liquid crystal pixels.

7. A lateral electric-field type of liquid crystal display device comprising:

a display panel including a plurality of liquid crystal pixels arranged in a matrix; and a controller configured to perform intermittent driving to rewrite an image signal to liquid crystal pixels, wherein the relationship "R1×C1≈R2×C2" is satisfied, where R1 is a resistance of a liquid crystal applied to the liquid crystal pixels, C1 is a capacitance of the liquid crystal, R2 is a resistance of an alignment film applied to the liquid crystal pixels, and C2 is a capacitance of the alignment film.

8. The liquid crystal display device of claim 7, wherein the controller further performs inversion driving to rewrite the image signal to the liquid crystal pixels.

9. The liquid crystal display device of claim 7, wherein a resistivity of the liquid crystal applied to the liquid crystal pixels falls within a range of $1\times10^{13}$ to $5\times10^{14}$ Ω·cm, and a resistivity of the alignment film applied to the liquid crystal pixels falls within a range of $1\times10^{13}$ to $5\times10^{14}$ Ω·cm.

10. The liquid crystal display device of claim 9, wherein the controller further performs inversion driving to rewrite the image signal to the liquid crystal pixels.

* * * * *